US006640159B2

(12) United States Patent
Holmes et al.

(10) Patent No.: US 6,640,159 B2
(45) Date of Patent: Oct. 28, 2003

(54) REPLACEMENT LINER AND METHODS FOR A DISPENSING DEVICE

(75) Inventors: William K. Holmes, San Diego, CA (US); John D. Higham, Menlo Park, CA (US); Richard C. Arnold, Ellsworth, ME (US)

(73) Assignee: Omnicell Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/825,487

(22) Filed: Apr. 3, 2001

(65) Prior Publication Data

US 2001/0032035 A1 Oct. 18, 2001

Related U.S. Application Data

(63) Continuation of application No. 08/985,034, filed on Dec. 4, 1997, which is a continuation-in-part of application No. 08/761,726, filed on Dec. 5, 1996, now Pat. No. 6,039,467.

(51) Int. Cl.[7] .......... G06F 17/00

(52) U.S. Cl. .......... 700/244; 700/236; 700/240; 700/241; 700/242

(58) Field of Search .......... 700/236, 242, 700/241, 240, 244

(56) References Cited

U.S. PATENT DOCUMENTS

| | | | |
|---|---|---|---|
| 3,556,342 | A | 1/1971 | Guarr |
| 3,715,148 | A | 2/1973 | Beals |
| 3,744,867 | A | 7/1973 | Shaw |
| 3,762,601 | A | 10/1973 | McLauglin |
| 3,917,045 | A | 11/1975 | Williams et al. |
| 3,998,356 | A | 12/1976 | Christensen |
| 4,019,793 | A | 4/1977 | Gerding |
| 4,071,747 | A | 1/1978 | Pantanella |
| 4,114,965 | A | 9/1978 | Oye et al. |
| 4,179,724 | A | 12/1979 | Bonhomme |
| 4,209,211 | A | 6/1980 | Alford |

(List continued on next page.)

FOREIGN PATENT DOCUMENTS

| | | |
|---|---|---|
| CA | 2130252 | 2/1996 |
| FR | 2650426 | 2/1991 |
| JP | 405147706 | 6/1993 |
| SU | 656613 | 4/1979 |
| WO | WO 95/03587 | 2/1995 |
| WO | WO 96/21925 | 7/1996 |
| WO | WO 98/26746 | 6/1998 |

OTHER PUBLICATIONS

Product Brochure, Access Automated Drug Control System, Lionvill Systems, Inc., print date 7/63.

Product Brochure, Omnicell See and Touch Supply System, Omnicell Technologies, Inc., 1994.

"Burnout: Why Do We Blame the Nurse" Drug ATM's Can Reduce Error Rate. *AJN* Nov. 1995.

Borel, Jacque et al., "Effect of an automated nursing unit–based drug–dispensing device on medication errors" *Am.J Health–Syst.Pharm* 52:1875–9, 1995.

*Primary Examiner*—Donald P. Walsh
(74) *Attorney, Agent, or Firm*—Townsend and Townsend and Crew LLP

(57) ABSTRACT

The invention provides an exemplary method for restocking pharmaceutical or medical supply items into a dispensing unit having a processor, with at least some of the pharmaceutical or medical supply items being held in removable liners having a plurality of receptacles. According to the method, a request is entered into the processor to restock pharmaceutical or medical supply items. One of the liners is then removed from the dispensing unit and is replaced with a replacement liner having a new inventory of pharmaceutical or medical supply items. Information identifying the replacement liner is also entered into the processor.

40 Claims, 12 Drawing Sheets

U.S. PATENT DOCUMENTS 4,267,942 A 5/1981 Wick, Jr. et al.
4,360,125 A 11/1982 Martindale et al.
4,382,688 A 5/1983 Machamer
4,473,884 A 9/1984 Behl
4,575,719 A 3/1986 Bertagna et al.
4,626,105 A 12/1986 Miller
4,635,053 A 1/1987 Banks et al.
4,640,560 A 2/1987 Blum
4,691,470 A 9/1987 Landell et al.
4,695,954 A 9/1987 Rose et al.
4,717,042 A 1/1988 McLaughlin
4,737,910 A 4/1988 Kimbrow
4,783,740 A 11/1988 Ishizawa et al.
4,785,969 A 11/1988 McLaughlin
4,803,604 A 2/1989 Nichols et al.
4,811,764 A 3/1989 McLaughlin
4,813,753 A 3/1989 Relyea
4,839,505 A * 6/1989 Bardt et al. ................. 235/381
4,847,764 A * 7/1989 Halvorson ............. 364/413.02
4,866,661 A 9/1989 De Prins
4,896,024 A * 1/1990 Morello et al. ............. 235/381
4,942,275 A 7/1990 Addey et al.
4,962,491 A 10/1990 Schaeffer
4,967,906 A * 11/1990 Morello et al. ............. 206/387
4,967,928 A 11/1990 Carter
5,014,875 A 5/1991 McLaughlin et al.
5,047,948 A 9/1991 Turner
5,055,660 A 10/1991 Bertagna
5,069,511 A 12/1991 Swets et al.
5,200,891 A 4/1993 Kehr et al.
5,242,223 A 9/1993 Koves
5,257,693 A 11/1993 Kwasniak
5,259,668 A 11/1993 Teufel et al.
5,263,596 A 11/1993 Williams
5,267,174 A 11/1993 Kaufman et al.
5,276,810 A 1/1994 Kitamura et al.
5,291,191 A 3/1994 Moore
5,292,029 A 3/1994 Pearson
5,314,243 A 5/1994 McDonald et al.
5,346,297 A 9/1994 Colson, Jr. et al.
5,355,289 A 10/1994 Krenn
5,377,864 A * 1/1995 Blechl et al. .................. 221/2
5,381,315 A 1/1995 Hamaguchi et al.
5,392,951 A 2/1995 Gardner et al.
5,408,443 A * 4/1995 Weinberger .................. 368/10
5,459,648 A 10/1995 Courtney
5,460,294 A 10/1995 Williams
5,502,944 A 4/1996 Kraft et al.
5,537,313 A 7/1996 Pirelli
5,562,232 A 10/1996 Pearson
5,564,803 A 10/1996 McDonald et al.
5,611,051 A 3/1997 Pirelli
5,655,660 A * 8/1997 Dolin et al. ................ 206/538
5,661,978 A 9/1997 Holmes et al.
5,664,856 A 9/1997 Pacetti
5,673,983 A * 10/1997 Carlson et al. ............. 312/218
5,713,485 A 2/1998 Liff et al.
5,720,154 A * 2/1998 Lasher et al. ................. 53/411
RE35,743 E 3/1998 Pearson
5,752,235 A 5/1998 Kehr et al.
5,761,877 A * 6/1998 Quandt ........................ 53/155
5,883,806 A * 3/1999 Meador et al. ........ 364/479.14
5,927,540 A * 7/1999 Godlewski ..................... 221/2
5,940,306 A * 8/1999 Gardner et al. ........ 364/479.14
6,208,974 B1 * 3/2001 Campbell et al. .............. 705/3

* cited by examiner

REPLACEMENT LINER AND METHODS FOR A DISPENSING DEVICE

CROSS REFERENCE TO RELATED APPLICATIONS

This application is a continuation of copending U.S. patent application Ser. No. 08/985,034 filed Dec. 4, 1997, which is a continuation-in-part of U.S. patent application Ser. No. 08/761,726, filed Dec. 5, 1996, now U.S. Pat. No. 6,039,467 issued Mar. 21, 2000, the complete disclosures of which are herein incorporated by reference.

BACKGROUND OF THE INVENTION

The present invention relates generally to the field of item dispensing, and particularly to the dispensing of items within a medical facility. In one specific aspect, the invention provides a dispensing unit having a lighting system which guides a caregiver to a specific storage bin which holds a selected item.

Traditionally, many large medical facilities maintained essentially all of their medical supplies in a central inventory location. Such an arrangement in many cases proved to be inconvenient because of the large distance between the central inventory location and the patients who used the supplies. To facilitate the delivery of supplies to the patients, some medical facilities have begun to rely on the use of local dispensing stations. Such dispensing stations are placed in the medical facility nearer to the patients and are designed to hold various supplies and pharmaceuticals typically needed by the patients. Such dispensing stations typically have the ability to maintain records on the number and type of items that are both dispensed and restocked. Further, such dispensing stations may be configured to provide different levels of security to the items held therein. For instance, the items may be freely available to any caregiver. Higher levels of security may be provided by including various locks or restrictive devices to prevent access to either the number or type of items to be dispensed.

One particular type of dispensing device which is becoming accepted within the medical industry comprises a cabinet having a plurality of retractable drawers which hold the items. The individual drawers are often divided into bins so that more than one type of item may be held within each drawer. Security may be provided by providing locks on the drawers to allow access to only certain caregivers, certain items and/or certain times of day.

When using such drawers in a secured environment, a number of issues need to be addressed. For example, it would be desirable to provide convenient access to each of the bins, including the ability to quickly locate a bin having a selected item. It would further be desirable to efficiently utilize the space of each drawer so that a maximum number of items could be held within the cabinet. Further, it would be desirable to allow the bins to be arranged in different sizes so that each drawer could be customized depending upon the types of items that are to be stored.

The ability to address some or all of these issues while still providing adequate security is especially challenging. For example, U.S. Pat. No. 5,014,875 describes a dispensing station having a plurality of retractable drawers. To provide security to the items and to assist a caregiver in the location of a selected item, a carousel system is included in the drawers. However, such a system is a gross under-utilization of drawer space and is therefore undesirable.

Another issue that needs to be addressed with such dispensing stations is the need to restock dispensed items.

Previously proposed methods include individually restocking each bin with a supply cart that is transported throughout the medical facility. However, restocking in this manner is time consuming, thus preventing access to the supplies for long time periods during restocking, and may also lead to inventory restocking errors.

A further consideration in the development of a dispensing station which is divided into a matrix of bins is that of ensuring a user will properly select the correct bin. Recent studies indicate a high incidence of removal errors from such dispensing stations. Healthcare providers are therefore anxious to reduce removal errors which stem from users selecting incorrect items from a tray containing many bins.

It would therefore be desirable to provide systems, methods and apparatus to overcome or greatly reduce these and other problems. It would be particularly desirable if a dispensing system were provided which would provide some level of security to the items while still providing convenient access to the items, including the ability to easily locate a selected item so that removal errors may be reduced. Such a dispensing system should also efficiently utilize the storage space so that large inventories of items or large numbers of items may be held therein. It would be further desirable if such a dispensing system could be tailored to allow for different sized items to be stored therein. Further, it would be desirable if such a system were easy to restock so that time and errors could be reduced when replenishing the dispensed items.

SUMMARY OF THE INVENTION

The invention provides an exemplary dispensing system for dispensing various types of items. Although useful in a wide variety of applications, the dispensing system will find its greatest use in dispensing medical supplies, pharmaceuticals, and the like in medical facilities. In one exemplary embodiment, the dispensing system comprises a cabinet having at least one storage location. A plurality of adjustable dividers are provided to divide the storage location into a plurality of bins. In this way, the number and size of bins may be tailored to accommodate various types of items. A processor is further provided and includes a memory for storing a list of items which are held within the bins as well as an entry device for entering requests for item removal. A plurality of light indicators are operably attached to at least some of the dividers. The light indicators are arranged such that at least one light indicator will uniquely identify one of the bins when lighted. For example, the light indicator may be in the shape of an arrow or other pointer which points to the correct bin. With this arrangement, a caregiver may enter an item removal request into the processor, and the bin having the requested item will be lighted to unambiguously guide the caregiver to the correct bin.

In an alternative aspect, at least two light indicators, which are preferably opposite of each other, may be employed to unambiguously and uniquely identify one of the bins when lighted.

In one exemplary aspect, the cabinet is provided with a plurality of drawers which function as storage locations. A plurality of light sources are provided within each drawer, and a liner is removably held within each drawer above the light sources. With this configuration, the adjustable dividers may be employed to divide the liner into a plurality of bins. When the liner is placed into the drawer, each light indicator is aligned with one of the light sources. In this manner, regardless of the configuration of the dividers, each light indicator will always be aligned with a light source so that any one of the bins may be lighted when selecting an item.

The dividers will preferably be configured so that the bins will be orthogonal in geometry when connected to the liner. Further, the light sources will preferably be arranged in a two dimensional array so that a light indicator will always be aligned with one of the light sources, regardless of the arrangement of the dividers.

In another exemplary aspect, the light indicators comprise light pipes which are placed into direct contact with the light sources when the liner is placed into the drawer. Each light pipe will rest upon a corresponding light source by force of gravity or other mechanical device, thereby insuring an adequate contact between each light indicator and light source.

In another exemplary aspect, the light pipes comprise elongated columns of a light transmitting material, and the light sources comprise LEDs. When the light pipes are placed into contact with the actuated LEDs, collimated light is transmitted through the light pipes.

In yet another aspect, the liner includes an identification device having information regarding the arrangement of the dividers and the items stored in each bin. The cabinet further includes a reader for reading the information from the identification device upon placement of the liner into the drawer or in proximity to a scanning device. The reader then transfers this information to the processor so that the processor will know which light indicators to light when a caregiver selects an item. Alternatively, the identification device may comprise an identifier, label, title, serial number, or the like which uniquely identifies the particular drawer. With this arrangement, a separate database having information relating to the configuration of the bins, the items stored therein, and the associated identifier will be provided. This information may be supplied to the processor (usually via a network from a host computer) so that when the dispensing unit reads the identifier on the identification device it will know the configuration of the bins and the items stored therein.

In still another aspect, drawer locks are provided within the cabinet to lock the drawers until receiving a signal from the processor. Each drawer may also include a visual indicator so that when an item is selected from the list of items, the visual indicator on the drawer having the selected item will be actuated. In yet another aspect, a sensor may be provided to detect if one of the drawers is retracted from the cabinet.

The invention further provides an exemplary method for dispensing items from a dispensing unit having a plurality of retractable drawers which are divided with dividers to form a plurality of bins for holding the items. According the method, item identification information is entered into the dispensing unit to select a desired type of item. One of the drawers having the selected item is withdrawn, and at least one light indicator which is adjacent to the bin having the selected item is lighted. Having been guided to the correct bin, a caregiver then removes the desired quantity of the selected type of item from the lighted bin.

In an alternative aspect, at least two light indicators may be lighted (preferably on opposite sides of the bin) to uniquely identify the correct bin. In one particular aspect, user and/or patient identification information are entered into the dispensing unit before selecting the item. In another aspect, a visual indicator is actuated on the drawer having the selected item to guide the caregiver to the correct drawer.

In one alternative aspect, the caregiver enters into the dispensing unit the quantity of items that have been removed from the bin. After entering this information, the drawer is closed. In the event that such information is not entered, the dispensing unit produces a record of the discrepancy. Optionally, an alarm or message may be provided to alert the caregiver of the discrepancy.

In still another aspect, the liner is periodically removed and replaced with another liner having a full inventory of items. The replacement liner may have a bin arrangement and/or inventory of items that are the same or different from the first liner. The dispensing unit is configured to detect the arrangement of the bins and the items within each bin so that when another item is selected from the list of items, at least one light indicator which is adjacent to the bin having the selected item will be lighted.

The dispensing unit may detect the configuration of the bins and the items within the bins in a variety of ways. For example, an identification device may be included on the drawer which includes the configuration and item information. This may then be directly read into the processor. Alternatively, the identification device may be a label (such as a serial number) which uniquely identifies the particular drawer. With this arrangement, a separate database having information relating to the configuration of the bins and the items stored therein will be provided. This information may be supplied to the processor (usually via a network from a host computer) so that when the dispensing unit reads the label on the identification device it will know the configuration of the bins and the items stored therein.

The invention still further provides an exemplary method for stocking items into drawers of a dispensing unit. According to the method, a liner is provided having a plurality of adjustable dividers. The dividers are arranged within the liner to form a preselected arrangement of bins. Different types of items are placed into the bins, and an identification device is attached to the liner which includes information identifying the arrangement of the dividers and the types of items held in the bins. The liner is then placed into the drawer, with the drawer including a reader which reads the information from the identification device. In this manner, the dispensing unit will know the specific configuration of the bins and which items are held in each of the bins. With this arrangement, the liner may be removed from the drawer after various items have been dispensed and replaced with a second liner having the same and/or a different arrangement of bins.

In a further embodiment, the invention provides an exemplary method for restocking pharmaceutical or medical supply items into a dispensing unit having a processor, where at least some of the pharmaceutical or medical supply items are held in removable liners having a plurality of receptacles. According to the method, a request is entered into the processor to restock pharmaceutical or medical supply items into the dispensing unit. One of the liners is removed from the dispensing unit, and the removed liner is replaced with a replacement liner having a new inventory of pharmaceutical or medical supply items. Information identifying the replacement liner is also entered into the processor.

In one particular aspect, the replacement liner includes an identification device having information on the configuration of the receptacles, the types of items held in the receptacles, and the quantity of items held in the receptacles. With such an arrangement, the information from the identification device is read with a reader upon placement of the liner into the-dispensing unit. This information is then transferred from the reader to the processor so that the processor's records may be updated.

Preferably, the identification device comprises an electronic memory device, and the dispensing unit includes a recording device to record information regarding the items removed from the liner onto the memory device. In this way, the record of removal that is stored in the memory device may be compared with actual inventory levels in the liner to determine any discrepancies. Typically, the record of removal is compared with the actual inventory levels at a pharmacy station following removal of the liner.

In another particular aspect, the liners are grouped into types based on the configuration of the receptacles and the types and par levels of items held within the receptacles. With this arrangement, the processor is configured to include a record of each type of liner. In this way, the processor is able to determine the configuration of a restocked liner by entering the liner type of the restocked liner into the processor.

Preferably, the dispensing unit is partitioned into separate locations, and the processor includes a record of which types of liners may be placed into each of the locations. In one aspect, after the type of liner which is being replaced is entered into the processor, an error message and an audible alert is produced if the liner type entered is incorrect. In another aspect, the processor's record is updated to reflect new quantities of each item upon entry of information into the processor that the replacement liner has been placed into the dispensing unit. The new quantities can be assumed to be the par values for each item, or can be entered at the pharmacy restocking location and sent to the processor. In either case, the restock technician may have the option to alter the quantity at the dispensing unit, in the event that the actual quantity of a particular item is different than the quantity the processor expects.

In yet another aspect which occurs during restocking, a list of liner types is transferred to the processor from a central pharmacy. This list indicates the liner types that are to be restocked into the dispensing unit. In still another aspect, the type of liner is stored on the liner, and the type of liner is read from the liner by a reader that is in communication with the processor before the liner is placed into the dispensing unit. Typically, the dispensing unit includes a plurality of locked drawers which hold the liners. With such a configuration, only the drawer containing the entered type of liner is unlocked when the type of liner has been electronically read by the reader. Preferably, the user is guided to the unlocked drawer by a visual indicator. optionally, each drawer may be marked with one of the types so that a user may visually identify the type of liner to place in each drawer.

In one exemplary aspect, a liner is restocked by opening one of the drawers and having the processor detect which drawer is open. The liner is then replaced and a confirmation of the liner type that was placed in the drawer is entered into the processor. An alarm is then produced with the processor if an incorrect liner was placed into the drawer.

In one particularly preferable aspect, the liners are each assigned a unique identifier, and the identifier for an expected replacement liner is entered into the processor, e.g., from a central pharmacy, prior to entering the restocking request. When ready to restock, the unique identifier for the replacement liner is then entered into the processor by the restock technician. An alarm is preferably produced if the identifier for the expected liner is different from the identifier entered upon replacement of the replacement liner.

Preferably, the replacement liner is filled at a pharmacy station which assigns the unique identifier to the replacement liner and produces a record of the configuration of the receptacles, the types of items held in the receptacles, and the quantity of items held in the receptacles. Such information is then transmitted to the processor of the dispensing unit.

In one aspect, the unique identifier is included on the liner, and is then read from the liner with a reader that is in communication with the processor prior to placement of the replacement liner into the dispensing unit. Alternatively, the identifier may be manually entered into the processor.

The invention further provides an exemplary system for dispensing and replenishing pharmaceutical or medical supply items. The system comprises a dispensing unit which includes a cabinet having a plurality of retractable drawers and a plurality of liners that are divided into receptacles for holding pharmaceutical or medical supply items. Further, at least some of the drawers hold at least one liner. A processor is also provided and includes a data base to store a record of the configuration of the receptacles in each liner and the types and quantities of items held within the receptacles.

In one particular aspect, the replacement liners each include an identification device having information on the configuration of the receptacles, the types of items held in the receptacles, and the quantity of items held in the receptacles. A reader is also in communication with the processor to read the information from the identification device and to transfer the information to the processor. Preferably, the identification device comprises an electronic memory device, and the dispensing unit includes a recording device to record information regarding the items removed from the liner so that a record of removal that is stored in the memory device may be compared with actual inventory levels to determine any discrepancies. Preferably, the dispensing unit includes a plurality of drawers, and the liners are held within the drawers.

In another particular aspect, the liners are grouped into types based on the configuration of the receptacles and the types of items held within the receptacles. Further, the processor includes a record of each type of liner. Preferably, the dispensing unit is partitioned into separate locations, and the processor includes a record of which types of liners may be placed into each of the locations so that an error message may be produced with the processor if the replacement liner is placed into an unpermitted location.

In another aspect, the processor is adapted to be placed in communication with a central pharmacy so that a restock list of liner types may be transferred to the processor from the central pharmacy. In this way, the processor may provide a set of instructions as to which type of liner may be placed into each of the locations.

In still another aspect, the type of liner is stored on the liner, and a reader is in communication with the processor to read the type of liner from the liner. In one preferable aspect, the dispensing unit includes a plurality of lockable drawers to hold the liners. Further, the processor is configured to send a signal to unlock the drawer containing the type of liner when the type of liner has been read electronically with the reader. Optionally, a visual indicator may be disposed on each of the drawers. In yet another aspect, each drawer is marked with one of the types so that a user may visually identify the type of liner to place in each drawer.

In still another particularly preferable aspect, the liners each include a unique identifier, and the processor includes a list of identifiers corresponding to replacement liners that are expected to be placed into the dispensing unit prior to entering the restocking request. The dispensing unit further includes an entry device to enter the unique identifier for the replacement liner into the processor so that it may be compared with the expected identifier stored in the list.

Preferably, the processor further includes a record of the configuration of the receptacles for each liner, the types of items held in the receptacles, and the quantity of items held in the receptacles. In one aspect, the unique identifier is included on the liner, and a reader is in communication with the processor to read the identifier from the liner prior to placement of the replacement liner into the dispensing unit.

In still yet another particularly preferable aspect, each liner includes a unique identifier, and the liners are grouped into types based on the configuration of the receptacles and the types and par levels of items held within the receptacles. Further, the processor includes a table having a list of each identifier, its corresponding type, and its associated drawer. An entry device is further provided to enter the identifier for each liner that is to be restocked into the processor prior to replacing the liner. Preferably, the processor is adapted to receive the entry of the table to initially configure the dispensing unit. During restocking, a list of liner identifiers that are to be restocked is then sent electronically from a central pharmacy station which fills the liners with the items. Preferably, the list will also include the actual quantities of items that are being restocked if different that the par levels. Optionally, the unique identifier may be included on a bar code label, and a bar code reader is in communication with the processor to read the bar code from the label. In one aspect, the processor is configured to indicate which drawer is to receive the replacement liner upon entry of the identifier into the processor.

DESCRIPTION OF THE PREFERRED EMBODIMENTS

Figure 1:
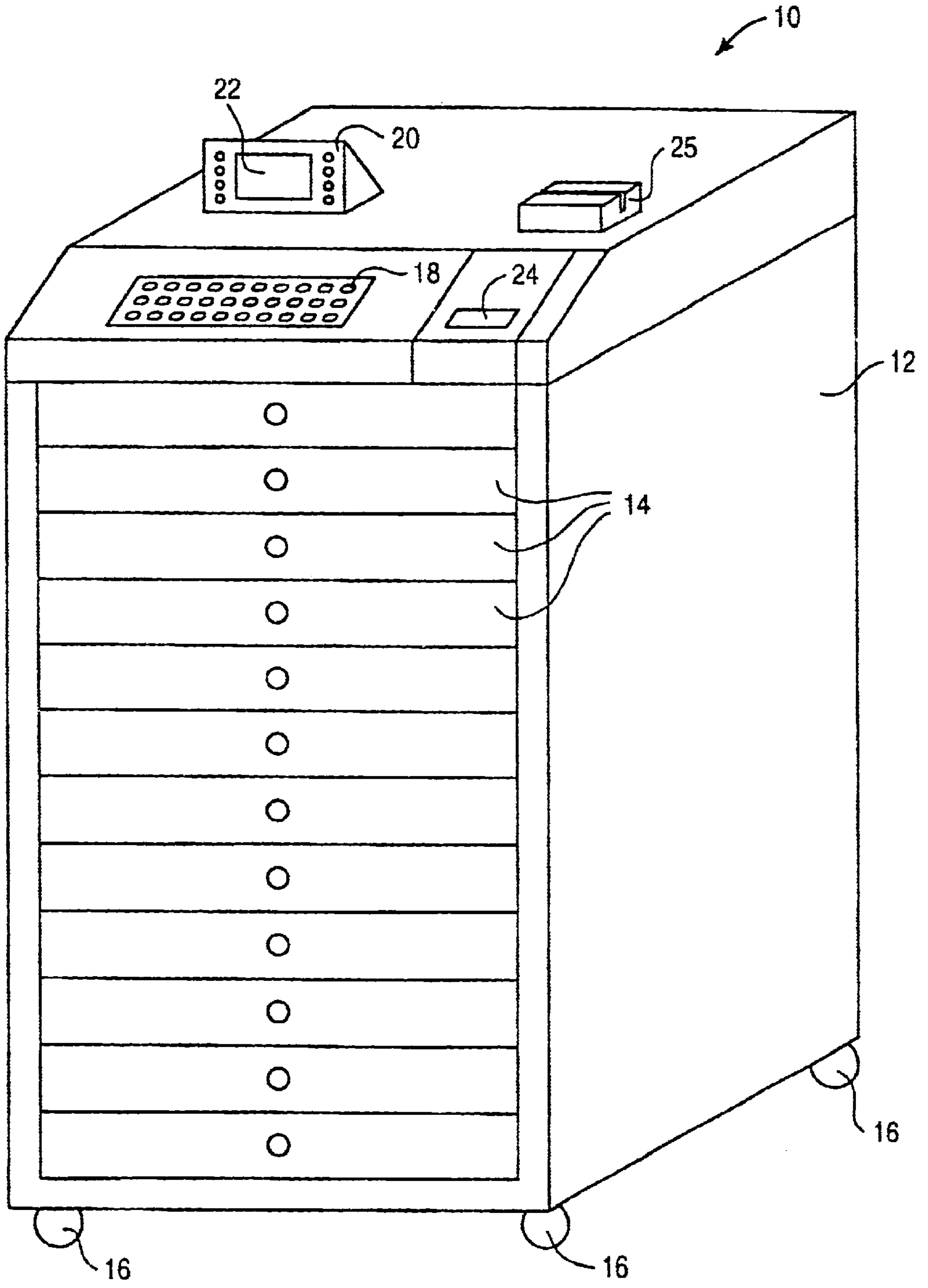
FIG. 1 is perspective view of an exemplary dispensing unit according to the present invention.

The invention provides an exemplary dispensing unit and methods for dispensing various items and for periodically restocking the items into the dispensing unit. Although useful in dispensing a wide variety of items, the invention will find its greatest use in medical facility environments where various medical supplies and pharmaceuticals are dispensed. The dispensing unit of the invention is related in (some aspects to the dispensing devices described in co-pending application Ser. Nos. 08/544,379, filed Oct. 10, 1995, and 5,905,653 (attorney docket no. 16166-000311), filed on the same date as the present application. The complete disclosures of all these references are herein incorporated by reference. Further, the features described in the present application may be useful with the dispensing unit described in copending application Ser. No. 08/250,223, filed May 27, 1994, the complete disclosure of which is herein incorporated by reference.

One particular feature of the dispensing unit of the invention is its ability to assist the caregiver in locating a selected item and ensuring accuracy in the process of taking the item. This is best accomplished by uniquely lighting at least a portion of a bin having the selected item so that the caregiver can quickly identify the location of the item. Such a lighting system may be employed with a variety of dispensing unit configurations, including those where the items are held in drawers, shelves, racks, and the like. The lighting system will be particularly useful in flexible storage location arrangements where the-number and size of the individual bins which hold the items may be varied.

In one particular aspect, the dispensing unit of the invention will preferably comprise a cabinet having a plurality of retractable drawers. The drawers provide security to the items held therein by remaining locked to the cabinet until certain information is entered into a processor. In this way, the medical facility can control access to the items by configuring the dispensing unit to allow access to its drawers only when the requisite information has been entered. Such information can include, for example, patient identification information, caregiver identification information and password, item identification information and the like.

The dispensing unit of the invention is configured to optimize the storage space within each of its drawers. Such optimization is provided by including adjustable dividers which are employed to create customized bins to accommodate different sized items. In this manner, the space within each drawer is more fully utilized. The drawers will also preferably be configured so that they can fit within a cabinet having dimensions which are generally accepted by the health care industry. The height of each drawer may also be varied to optimize the space within the cabinet. For example, each drawer may be designed to have a height that is either two inches or four inches so that the cabinet can uniformly be filled with different sized drawers.

Another feature of the dispensing unit of the invention is the use of removable drawer liners. This arrangement allows a liner having a depleted inventory to be quickly exchanged with a new liner having a full inventory of items, including current expiration dates for any medications. With this arrangement, the liners may be refilled from a central inventory or pharmacy area rather than in the hall where caregivers may need to access the dispensing unit. Additionally, the liners may be constructed from relatively inexpensive materials, such as plastics, so that the liners may be discarded after use or recycled. In turn, this greatly reduces the cost to the health care facility.

Still another feature is that each liner may have an identification device included thereon which is readable by the dispensing unit so the dispensing unit will know the specific configuration of bins and items held therein when placed into each drawer.

Referring now to the figures, an exemplary dispensing unit 10 will be described. As shown in FIG. 1, dispensing unit 10 comprises a cabinet 12 having a plurality of retractable drawers 14. Although shown with 12 drawers, the number of drawers may be varied. For example, in one preferable configuration, cabinet 12 will include 13 or 14 drawers. Conveniently, cabinet 12 rests upon a plurality of wheels 16 which allows the dispensing unit 10 to be wheeled throughout the health care facility. Although cabinet 12 may be fashioned with various dimensions, a preferable size will be about 26 inches wide and 23 inches deep.

Dispensing unit 10 further includes a processor (hidden within cabinet 12) and a keyboard 18 for entering various information into the processor. For example, keyboard 18 may be employed to enter patient identification information, caregiver identification information, requests for item removal, and the like into the processor. Optionally, dispensing unit 10 may further include a second entry device 20 which is connected to the processor and includes a screen 22 which allows the caregiver to scroll through various lists of information in order to select a highlighted item. For example, a caregiver may scroll through a list of patient names or item names in order to select a certain patient or to enter an item removal request. Conveniently, a printer 24 is provided on cabinet 12 to print various reports generated by the processor.

Optionally, cabinet 12 may further include a mag or bar code reader 25 which is connected to the processor. Reader 25 may be provided to allow a user or a patient to be conveniently identified by swiping an appropriate ID card through reader 25. Reader 25 may also be employed to read an identification device associated with the drawers as described in greater detail hereinafter.

Figure 2:
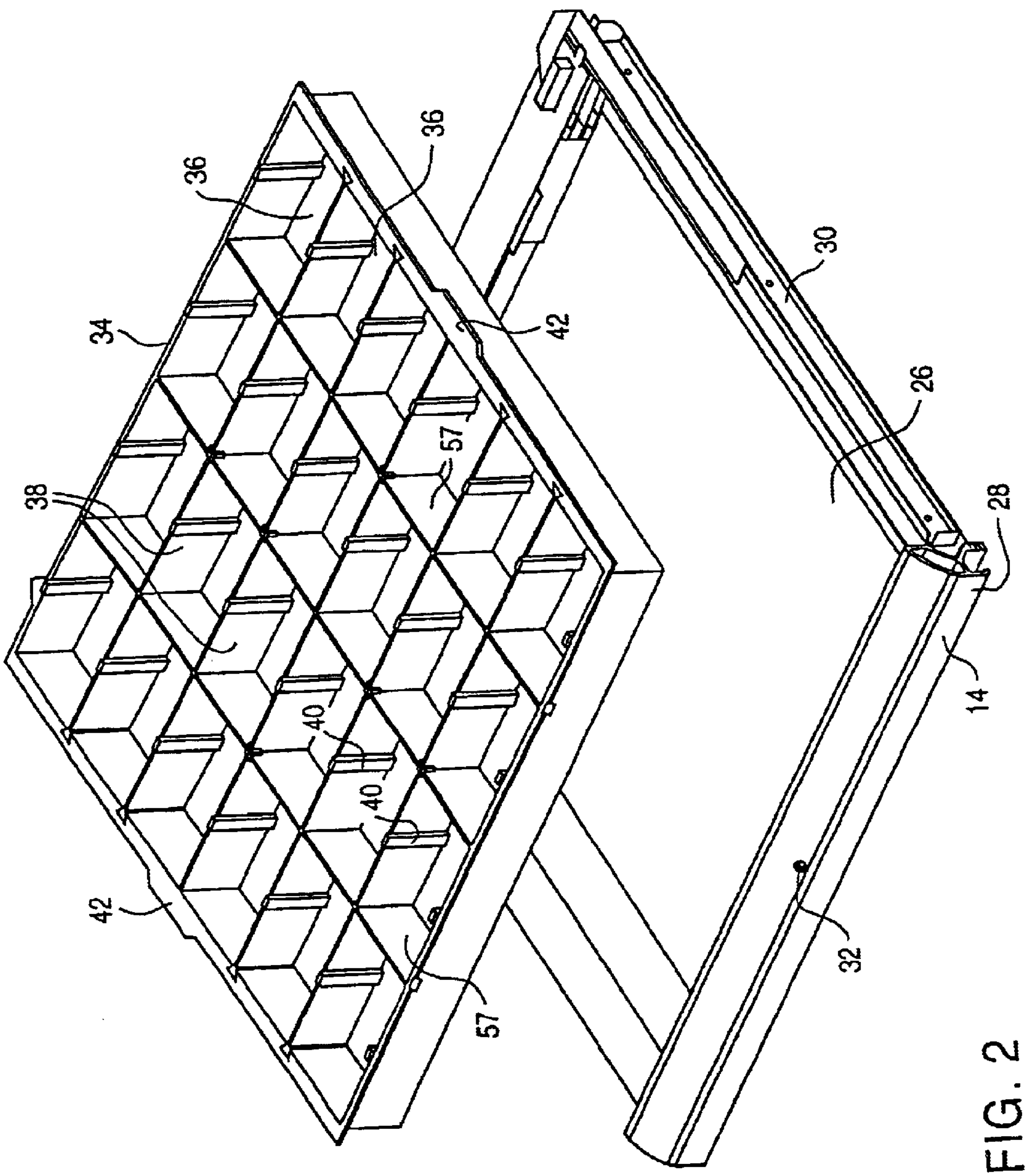
FIG. 2 is a perspective view of a drawer of the dispensing unit of FIG. 1 having a removable liner according to the invention.

Referring now to FIG. 2, one of drawers 14 will be described in greater detail. Drawer 14 comprises a frame 26 having a handle 28 and a track 30 which allows the tray to be slid in an out of cabinet 12 (FIG. 1). A visual indicator 32, such as an LED, is provided on drawer 14 to allow a specific drawer to be identified upon entering an item removal request as described in greater detail hereinafter. Drawer 14 is configured to receive a removable liner 34 which holds the items to be dispensed. Liner 34 is divided into a plurality of bins 36 by a plurality of adjustable transverse dividers 38 and longitudinal dividers 57. Attached to at least some of the dividers are light pipes 40 which are employed to guide a caregiver to a specific bin as described in greater detail hereinafter. Liner 34 is configured to conveniently rest within the frame 26 and may be removed by simply lifting liner from drawer 14 by handles 42.

Figure 3:
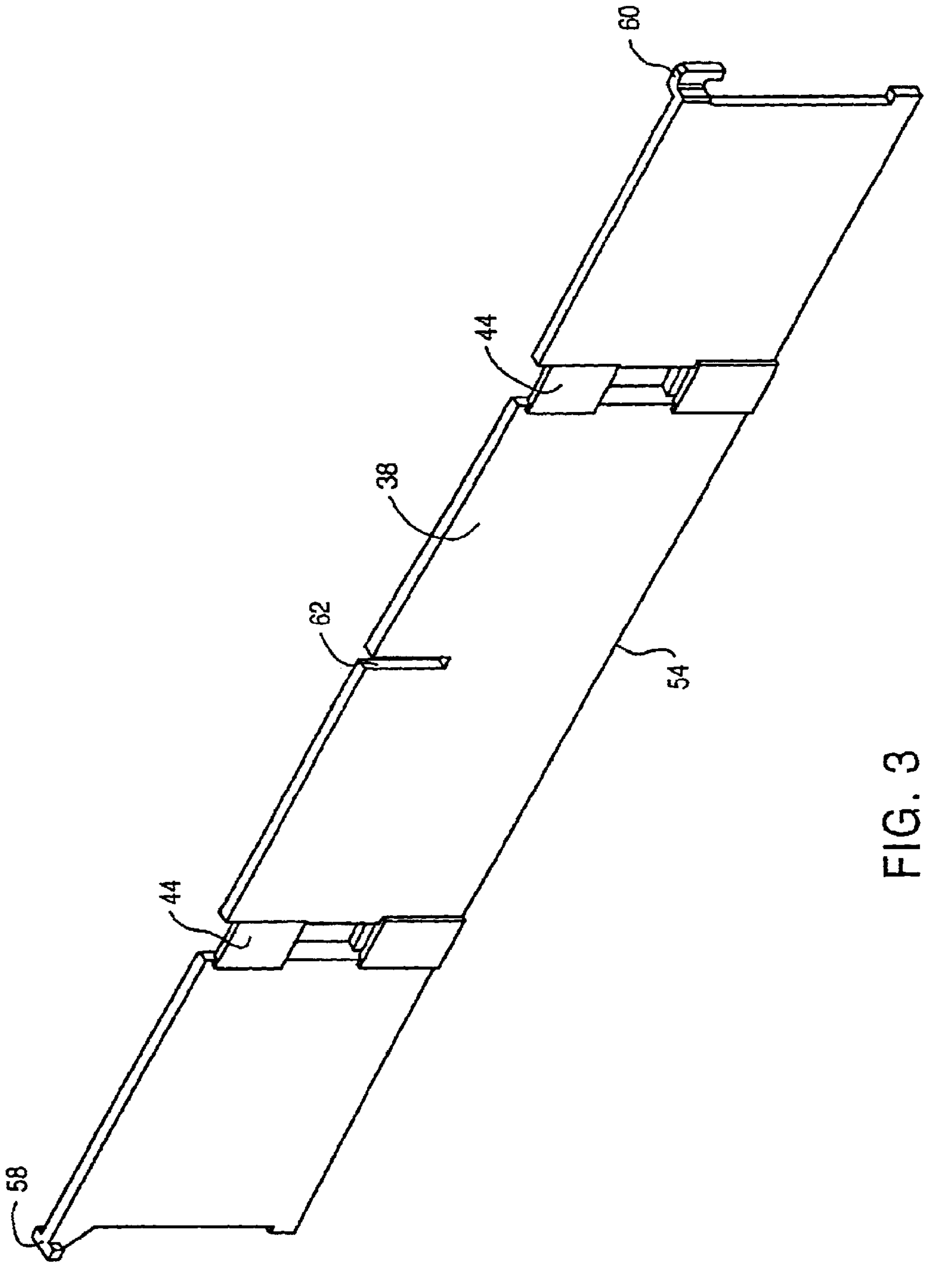
FIG. 3 is a perspective view of a transverse adjustable divider of the liner of FIG. 2.
Figure 4:
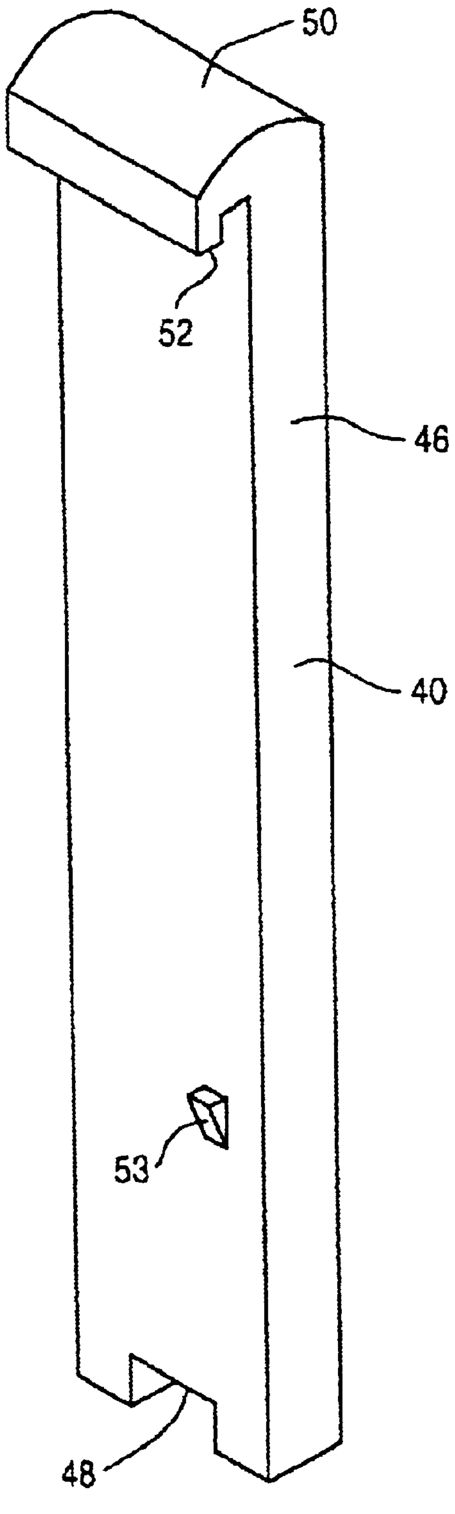
FIG. 4 is a perspective view of a light pipe that is attachable to the divider of FIG. 3.

Referring also now to FIGS. 3 and 4, construction of a transverse divider 38 to facilitate attachment of light pipes 40 will be described. As shown, divider 38 includes a pair of receiving regions 44 to which light pipes may be attached. Although shown with two receiving regions 44 it will be appreciated that additional numbers of regions may be provided depending upon the particular length of the divider or on the desired number of light pipes per bin. As shown in FIG. 4, light pipe 40 comprises an elongate body 46 having a recessed region 48, a top region 50 and a lip 52 at the top region 50. Light pipe 40 is attached to divider 38 by inserting lip 52 over receiving region 44 where light pipe 40 will rest on divider 38 by force of gravity or by a lock tab 53. Body 46 of light pipe 40 has a length which is longer than the height of divider 38 so that recessed region 48 will be below a bottom end 54 of divider 38. This allows recessed region 48 to extend below liner 34 so that it may engage a light source within drawer 14 as described in greater detail hereinafter. Further, recessed region 48 will preferably comprise a flat surface for interacting with the light sources as described in greater detail hereinafter. Light pipe 40 will preferably be constructed of a light transmitting material, such as acrylic, which will allow collimated light to pass through body 46 to illuminate top region 50. In this way, top region 50 may be brightly illuminated with a relatively small light source.

Figure 5:
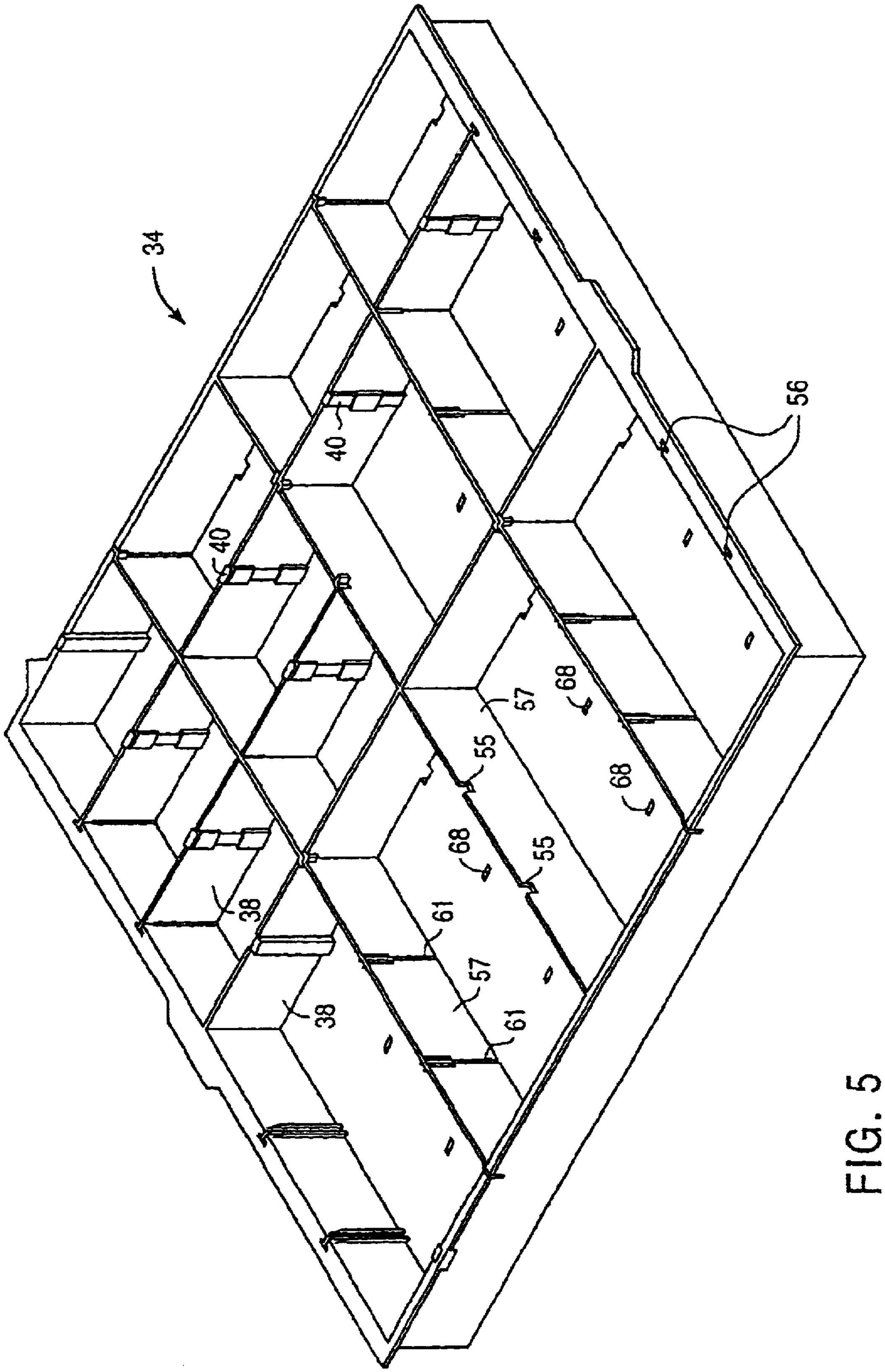
FIG. 5 is a perspective view of a removable liner of the dispensing unit of FIG. 1 having an alternative arrangement of bins which is made possible by the adjustable dividers according to the invention.
Figure 6:
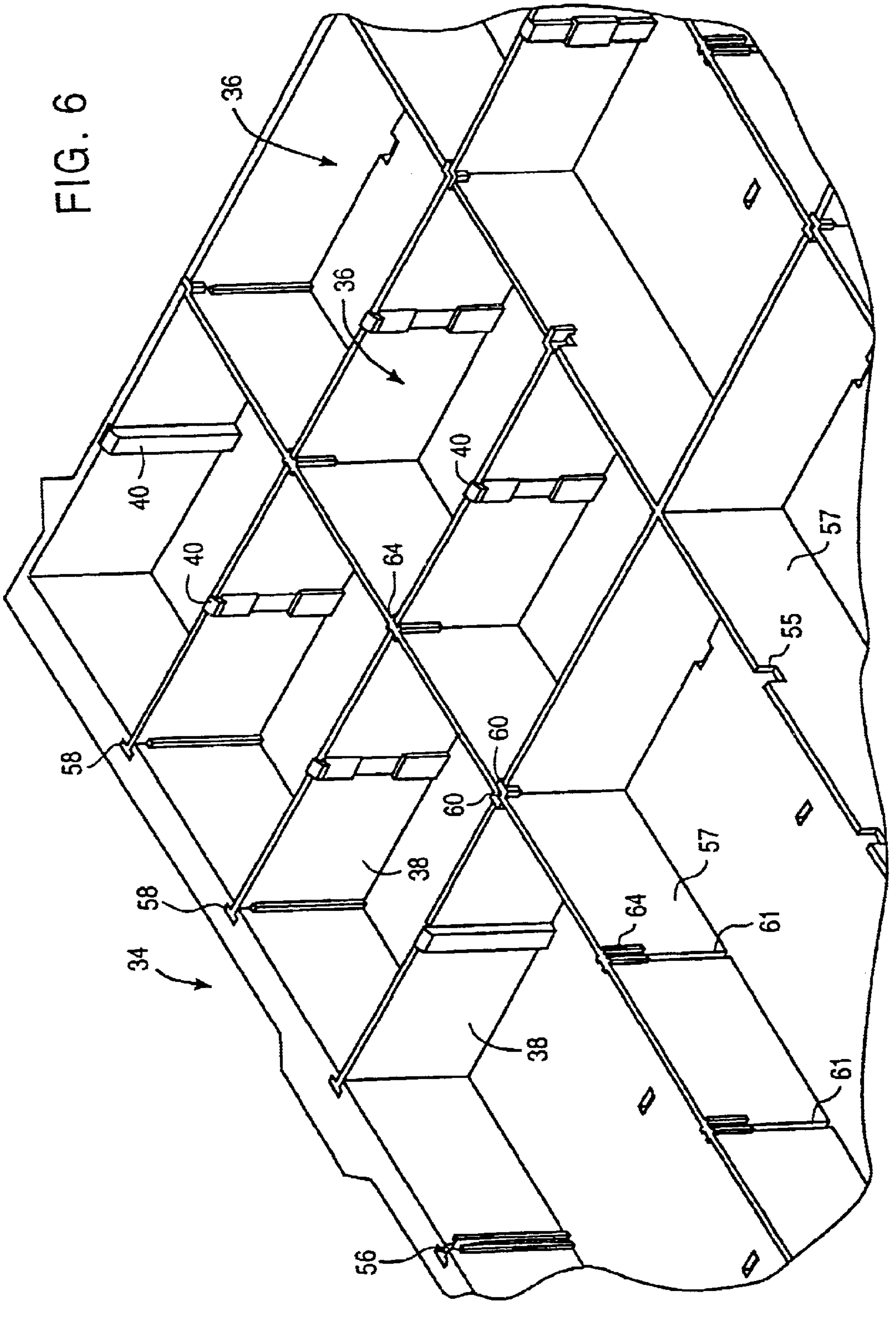
FIG. 6 is a more detailed view of the bins of FIG. 5.

As shown in FIG. 2, liner 34 is equally divided into a two dimensional array of bins. However, one particular advantage of employing dividers 38 is that the number and size of bins 36 may be tailored depending upon the particular items held within each bin. By way of illustration, one such arrangement is shown in FIGS. 5 and 6. To facilitate such an arrangement, liner 34 includes a plurality of elongated slots 56 into which the transverse dividers 38 (see FIG. 3) may be placed. More specifically, dividers 38 include a T-connector 58 at one end which is slid into slots 56 of liner 34. At the opposite end, divider 38 includes a Z-connector 60 which mates with a slot 55 of longitudinal divider 57. Some of longitudinal dividers 57 also include a slot 61 which is mated with one of slots 62 of divider 38 (see FIG. 3) to connect the dividers as shown in FIG. 6. Dividers 57 may also include a pair of tabs 64 to guide divider 57 over slot 62 when divider 57 is slid down divider 38. Hence, by providing various types of dividers, the dividers may be connected in various arrangements to form specific numbers of sizes of bins within liner 34.

Formed within liner 34 are a plurality of apertures 68 (FIG. 5) for receiving light pipes 40. Apertures 68 are sized to be large enough to allow light pipes 40 to pass through liner 34. Apertures 68 will preferably be arranged in a two dimensional array so that regardless of the configuration of dividers 38, an aperture 68 will be present for each light pipe 40.

In a preferred arrangement, at least two light pipes 40 which are attached to separate dividers 38 (preferably opposite of each other) will be associated with each bin 36 having an item stored therein. This arrangement allows a specified bin to be uniquely identified, e.g., by surrounding the bin, upon the selection of an item by lighting the two light pipes. It will be appreciated that more than two light types could be provided for each bin 36 if desired.

Alternatively, a single light pipe may be employed to uniquely identify the specified bin. For example, the light pipe could be configured in the shape of an arrow or other pointer which points the user to the correct bin.

Figure 7:
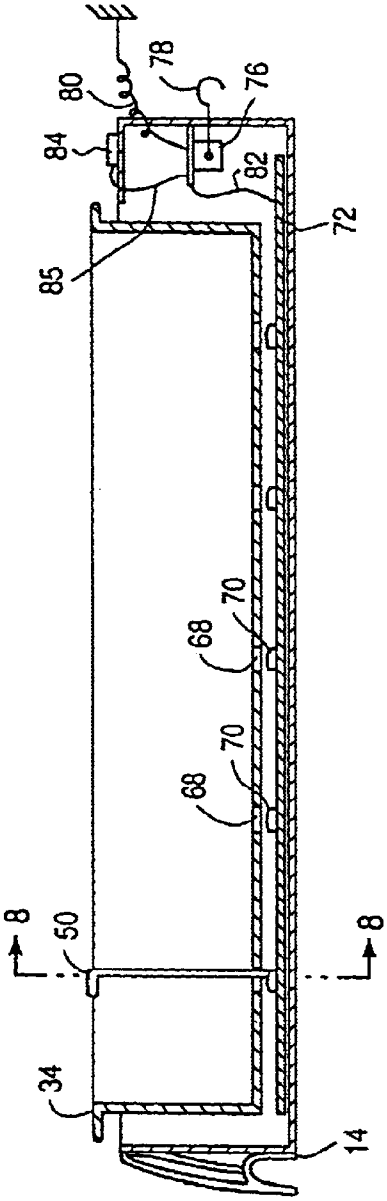
FIG. 7 is a cross-sectional side view of one of the drawers of the dispensing unit of FIG. 1.
Figure 8:
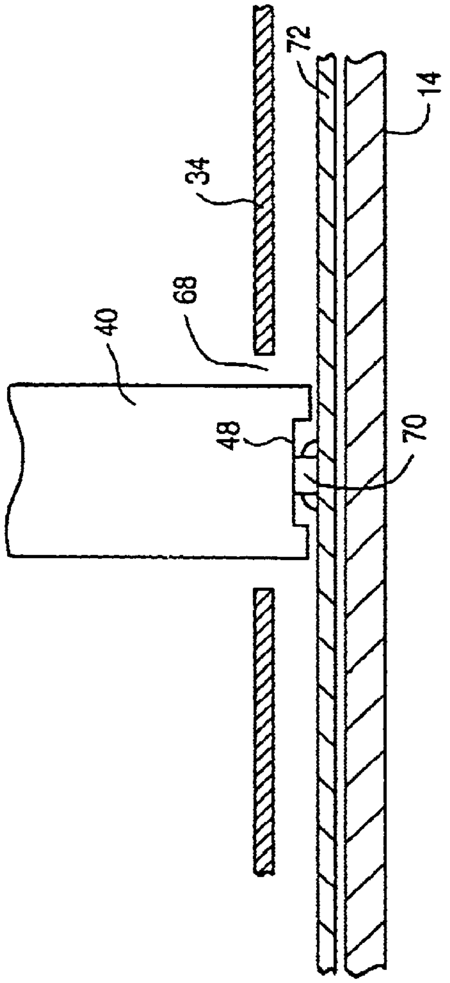
FIG. 8 is a cross-sectional side view of a portion of the drawer of FIG. 7 taken along lines 8—8.

Referring now to FIGS. 7 and 8, the integration of light pipes 40 with a plurality of light sources 70 will be described. Light sources 70 preferably comprise LED's having a generally flat-topped surface onto which recessed regions 48 of light pipes 40 (see FIG. 4) are received when liner 34 is placed into drawer 14. Hence, when liner 34 is inserted into drawer 14, light pipes 40 extend through apertures 68 and directly contact light sources 70. In this manner, each light pipe 40 will rest on a corresponding light source 70 by force of gravity or by some mechanical device. For example, the light sources 70 could be upwardly biased so that they will press against light pipes 40 when liner 34 is placed into the drawer. With this arrangement, no lens is needed between light source 70 and light pipe 40 to collimate the light. Instead, the light from the light source remains collimated through each light pipe 40 so that the top regions 50 will brightly illuminate. In this way, a relatively small light source, such as an LED, may be employed.

Light sources 70 will preferably be arranged in a two dimensional array which corresponds to the location of apertures 68 in liner 34. In this manner, regardless of the arrangement of dividers 38 and light pipes 40, every light pipe 40 will rest on a corresponding light source 70. Light sources 70 will preferably be surface mounted to a flexible PC "board" 72, which will preferably comprise an insulated nylon sheet. PC "board" 72 is connected to the processor so that signals may be sent to light selected ones of the light sources 70 to uniquely identify the bin having the selected item. Use of such a PC "board" of mylar is advantageous because of its relatively thin size which provides more storage space within drawer 14. Preferably, PC "board" 72 will be 0.010 inches thick or less.

As shown in FIG. 7, drawer 14 further includes a second PC "board" 74 which is in electrical communication with a solenoid 76 to move a latch 78. In turn, latch 78 is employed to lock drawer 14 to cabinet 12. Electrical current is provided to PC "board" 74 through a line 80, while power is supplied to PC "board" 72 by a line 82.

Optionally, drawer 14 may include a sensor 84 which is employed to detect when drawer 14 is withdrawn from cabinet 12. Sensor 84 is connected to PC "board" 74 by a line 85. If a caregiver neglects to close drawer 14 after a transaction, sensor 84 will detect that the drawer is still open so that an alarm or reminder signal may be produced by the processor. An exemplary sensor will comprise an infrared source and receiver. With such a sensor, a vane will be employed to break the light path when the drawer opens.

Latch 78 will preferably unlock after appropriate information is entered into the processor by the caregiver. Such information can include for example, caregiver or patient identification information (including passwords) and item identification information. After a specified time period, latch 78 will again lock so that if the caregiver neglects to open the drawer, the drawer will relock. Hence, the drawer will be able to relock itself after a "time out" period has elapsed to prevent further access.

An exemplary method for dispensing items from dispensing unit 10 will now be described. Initially, a caregiver approaches dispensing unit 10 and enters user identification, and preferably also a private password using keyboard 18 or entry device 20. The caregiver then identifies the patient requiring a supply or medication. This is also entered into the processor using keyboard 18 or entry device 20. The caregiver then selects the desired supply or medication. This may be done by entering the name into keyboard 18, by scrolling through a list of items on screen 22, or by swiping an ID card through reader 25. Preferably, the caregiver will also enter the number of items of the selected type that are to be removed.

Upon selection, the processor will send a signal to light the visual indicator 32 on the specific drawer having the requested item. The processor will also send a signal to unlatch latch 78 so that drawer 14 may be withdrawn from cabinet 12. Alternatively, the drawer may include a switch which is accessible to the caregiver and which may be pressed by the caregiver to open the solenoid lock. The caregiver then retracts the proper drawer and will be led by at least one lighted light pipe 40 to the correct bin. More preferably, at least two light pipes 40 will be lighted to guide the user to the correct bin. For example, light pipes 40 on two opposing dividers 38 may be lighted. Alternatively, light pipes provided on adjacent dividers may be lighted. upon location of the lighted bin, the caregiver then removes the requested item (or a plurality of items of the same type) from the lighted bin.

At this point, the method provides the optional step of verifying the count of specific item taken. This is done by prompting the caregiver to enter into the processor via keyboard 18 or entry device 20 the number of items of the specific type that were removed and the number remaining. If the caregiver closes drawer 14 before verifying the count, the processor may produce an error message and/or produce an alarm. A record of this event will also preferably be maintained within the processor.

The invention further provides an exemplary method for restocking items into dispensing unit 10. Restocking is facilitated by use of removable liners 34. In particular, to restock a specific drawer, the drawer is opened and liner 34 is removed by simply lifting handles 42 and removing liner 34 from the drawer. Another liner having a full stock of inventory is then placed into the drawer.

The replacement liner may be configured to have the same arrangement of bins and items or a different arrangement of bins and items. The liner will preferably include an identification device which will allow the processor to identify the specific arrangement of bins and items held in the bins when certain information is transferred to the processor from the identification device by a reader on the drawer or the cabinet. For example, the identification device may comprises a smart or proximity chip, such as those commercially available from Racom Systems, Inc., Englewood, Colo., which includes information regarding the configuration of the bins and/or the types of items in the bins. With the configuration, the configuration and item information is transferred directly from the identification device to the processor.

Alternatively, the identification device may comprise an identifier, such as a label or a serial number bar code, that simply identifies the particular liner. This information is transferred by the reader to the processor which will then know the specific liner which has been placed into the cabinet. Preferably, only one drawer will be opened at a time so that the processor will know which drawer has received the liner. The processor further includes a database which includes information on the particular configuration of each liner, the items stored in each bin, and an associated serial number. This information will preferably be entered into a host computer at the time of filling by the supplier and then transferred to the processor via a network. Hence, when the reader reads the serial number from the liner, the processor will be able to look up the information on the bin configuration and the items stored in the bins. This information may then be updated within the processor when items are removed from or returned to the bins.

By configuring the liner in this manner, the liner may be restocked at a remote location so that time is saved and accuracy is assured when replacing the liner. Further, by employing the identification device, the liner can be adjusted to have any arrangement of bins and items. As previously described, the light sources 70 will be arranged such that each bin may be appropriately lighted when an item is selected, regardless of the bin configuration.

The use of a replaceable liner provides a number of advantages over restocking procedures which do not include a replaceable liner. However, the present invention is useful in combination with restocking procedures which do not use replaceable liners, including those restocking procedures described in the references previously incorporated by reference.

When a replaceable liner is not employed, restocking may proceed as follows. Typically a central processor in the pharmacy or supply storeroom is in frequent contact with all the dispensing units at the point-of-use locations. The central processor exchanges information with the dispensing units, and in particular the current quantity on hand for each item in each dispensing unit. At regular intervals, for example every morning, a restock list will be generated in the pharmacy or storeroom for each dispensing unit, detailing the quantity of each item that needs to be taken up to the dispensing units to bring the quantity in each receptacle up to a predetermined par level.

Frequently, other restock lists will be generated between the main restocking periods, e.g., in the late afternoon. Such restock lists are to replenish items that have fallen below a "critically low" quantity on hand level. This restocking process involves far fewer items, but reduces the risk that a dispensing unit will run out of stock during the night.

Restocking is typically done by a technician (for supplies) or a pharmacy trained technician (for pharmaceuticals). Pharmaceuticals are placed in labeled bags to take up to the dispensing units. In a preferred method, the central processor sends the list of items that have been requested and the quantities requested up to the dispensing unit together with a restock list identification number. In this way, when the technician arrives at the dispensing unit, the technician enters an ID and password into the processor and enters a request to perform a restock process. If the entered identification information allows them to restock, the processor presents a list of restock numbers whose items have not yet been replenished. Since items may come from multiple sources, it is preferred to provide multiple restock lists on the dispensing unit. The technician selects the number of the list for which the technician has brought items.

Preferably, the processor then actuates visual indicators on the drawers and receptacle locations where there are items that need to be replenished and unlocks the drawers. Alternatively, the processor may light the first item to be replenished and guide the technician light by light through the process. Typically, the former method is used, since lighting all the lights simultaneously allows the technician to select the first medication in the technician's restock container and find the proper receptacle. Such a method has been found to be easier than forcing the technician to find the first medication as dictated by the processor.

When the items are placed in the receptacle, the receptacle being accessed is known by the processor, either because it receives a signal from the lifting of a lid, or the pushing of a button. Alternatively, in the case of a drawer with a matrix of receptacles with no push buttons, the technician will preferably enter the location at the processor, or select it from a list of locations which the processor displays. When the location being restocked is known by the processor in any of the above methods, the processor displays to the technician the quantity that the processor expects is being restocked (based on the restock list the processor received electronically from the central processor). At this point in time, the restock technician must change the quantity if the quantity of the item that has been brought by the technician is different. This may be because there was not a sufficient quantity to fill the order in the pharmacy, or because the technician simply miscounted.

For narcotics and other controlled substances, a witness is required to observe this restocking process and confirm that the quantity placed in the receptacles is correct. The witness does this by entering their identification and personal password into the processor.

The methods described herein which rely on the exchanging of a tray or liner with an identically configured full exchange liner provide a variety of enhancements to the methods just described. First, in the case of medications, the pharmacist is ultimately responsible for the accuracy of the restocking process. The picking of medications, placing the medications in envelopes or containers, labeling (if necessary), and placing the medications in the correct receptacles at the dispensing unit is prone to human error. Typically such a process is easier to do in the pharmacy. More specifically, replacement liners with similar configurations can be lined up together and restocked simultaneously. Further, the pharmacist can more conveniently check this process in the pharmacy. In this way, the restocking error at the dispensing unit is reduced to the possibility of placing a liner in the wrong location, and methods for reducing or eliminating this error will be described hereinafter.

Secondly, the time consuming process of placing the pharmaceuticals in the receptacles takes place in the controlled environment of the pharmacy, rather than out on the nursing floor. This is beneficial, not only because medications that should be in a secure environment are exposed for a shorter period of time, but also because the restocking process interferes with the nurse's ability to take items from the dispensing unit. Other time consuming processes, like checking certain medications for expiration dates, can also now be done in the pharmacy.

At the dispensing unit, the restock technician simply informs the dispensing unit that the technician is replacing one or more liners in specific locations. The configuration of the liner is known by the dispensing unit processor, since it is sent up from the central processor. In the case of the individual restocking method described above, the quantity of each item being restocked may vary. Hence, the quantity is sent to the dispensing unit processor at each restock time. In the case of the liner replacement, this is not necessary unless the par level for any of the items in the liner have changed. Otherwise, the dispensing unit processor assumes the item is being brought up to par level. As with the individual restocking method, the dispensing unit processor offers the opportunity for the restocking technician to enter a different quantity on hand into the processor. For example, in cases where, when filling the liner in the pharmacy, it was found that there was insufficient quantities of an item to be able to bring it up to par. As with the individual restock method, a witness is typically required when a replacement liner contains controlled substances.

One particular advantage of the invention is that the methods for individual restocking and for liner restocking can be mixed, with some receptacles restocked by the individual restock method, and others by replacing the whole liner. Further, the two methods may be mixed for the same receptacle. That is, replaceable liner receptacles may also be individually restocked. For example, a pharmacy may perform the main restock of the day in the morning by replacing liners. However, they may use the individual receptacle method in the afternoon to see if any of the items in the liners are at a critically low level. They would then run a restock for just those items, and the restock technician would take up replenishment stock for just those items that were at a critically low level. The next morning, the restock process would revert back to the liner replacement method.

Figure 9A:
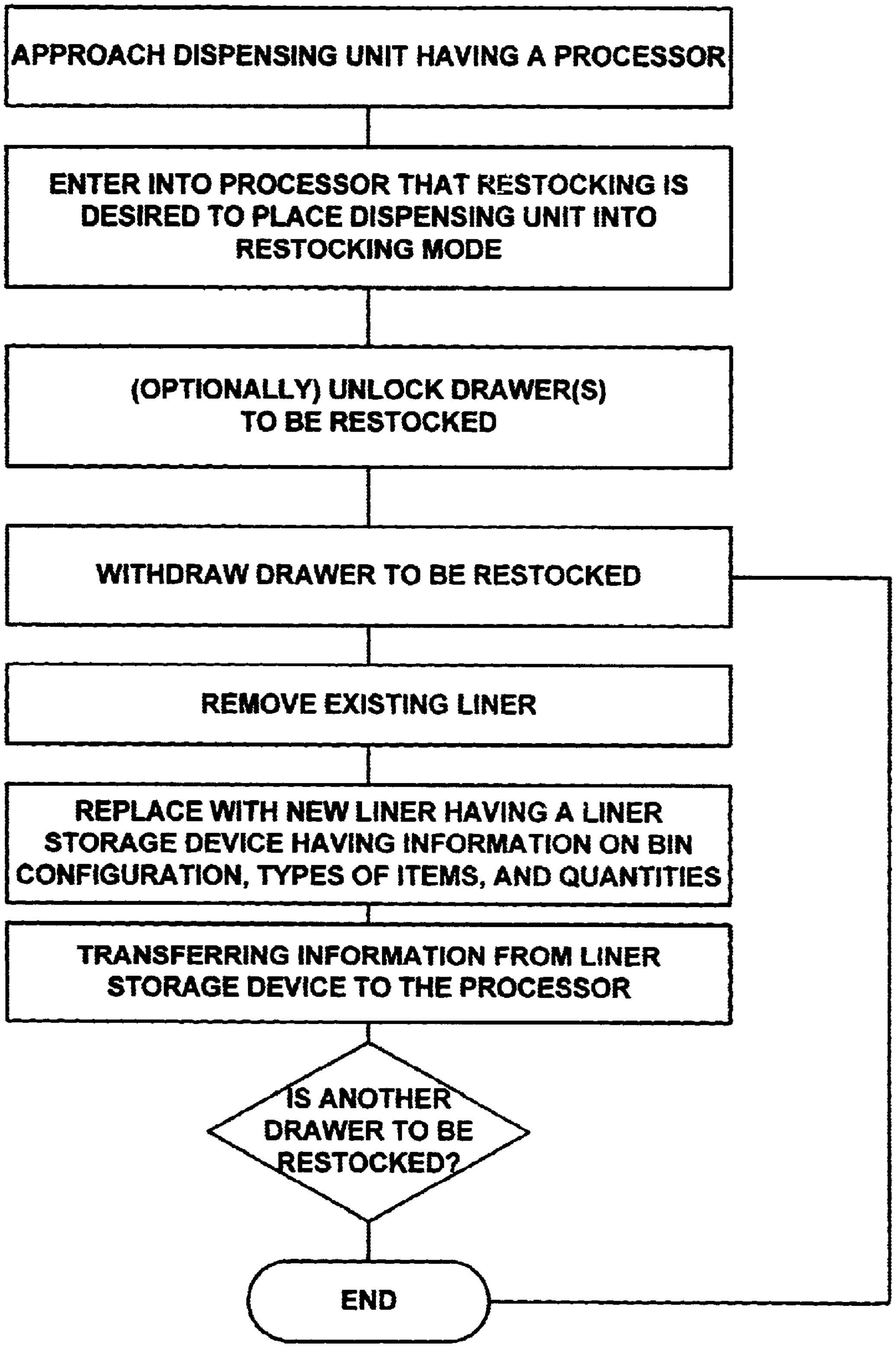
FIG. 9A is a flow chart illustrating an exemplary method for restocking items into a dispensing unit using liners having memory devices.
Figure 9B:
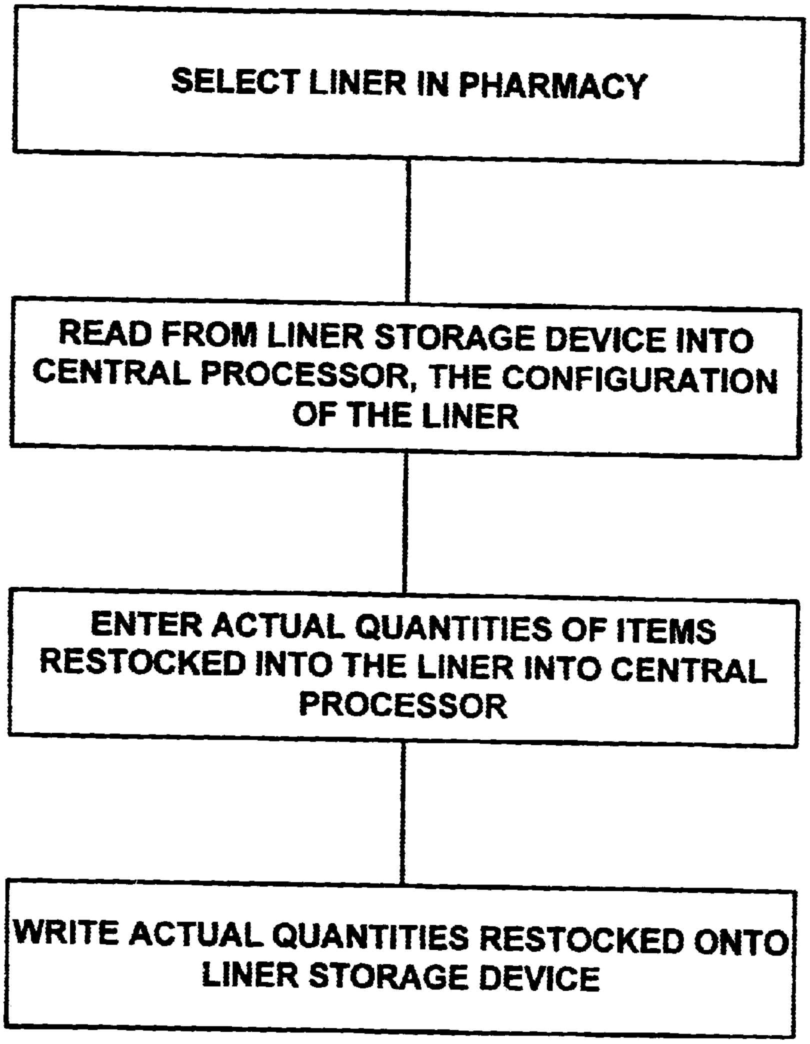
FIG. 9B is a flow chart illustrating an exemplary method for configuring a liner at a central pharmacy in preparation for restocking.

Generally, the invention provides three principal methods for replacing and tracking the liners. The first method is where the liner includes a device that can store multiple items of information as previously described. Methods of using such a liner are illustrated generally in FIGS. 9A–9C. As illustrated in FIG. 9B, when the liner is stocked in the pharmacy, a recording device in the pharmacy will encode on each liner storage device information describing the receptacle configuration, the items contained in the receptacles, the par quantity of the items intended to be stored in each receptacle and the actual quantities of the item placed in each receptacle. At the pharmacy, the liners are initially configured and pharmaceuticals and par levels assigned. This information is then entered into the central processor at the pharmacy. The central processor transmits this information to a writing device that records the information onto the liner storage device. In addition, each time the liner is restocked in the pharmacy, the quantity entered in each receptacle is written by the central processor onto the storage device on the liner.

In many cases, the quantity entered is the same as the par value, so it is unnecessary for the pharmacist or restock technician to enter this number for each receptacle, since it is known by the central processor. However, in the case where the pharmacy is short on stock for a medication, and cannot bring an item up to par, this can be entered into the central processor and recorded on the liner storage device in the pharmacy. In this way, when the liner is placed into the dispensing unit, the restock technician does not have to make any manual adjustments at the dispensing unit's processor since the dispensing unit may obtain the information from the liner storage device.

By employing the liner storage device, there is no need to send any restocking information from the central processor to the dispensing unit. Instead, as illustrated in FIG. 9A, the technician simply enters into the dispensing unit processor their identification and password and requests that the unit be placed in restocking mode. The technician then selects the drawer where the liner is to be replaced. This may be done by entering the request into the processor and having the processor unlock the drawer. Alternatively, the technician may press a button on the drawer the technician wishes to access. The liner is then replaced and the drawer is shut.

When the dispensing unit processor detects that the drawer is shut, or when the technician indicates to the dispensing unit processor that the restocking of the drawer is complete, the dispensing unit processor reads the information regarding the configuration items and quantities from the storage device on the liner. This is then repeated for the other drawers that need restocking. The technician then indicates completion of the restocking process by exiting the dispensing unit processor, or by transferring to a different function.

Because the information on the liner storage device completely describes the liner, it is possible to replace a liner with a liner of a different configuration and to have the processor detect the new configuration and adjust it's dispensing operations accordingly. Such a method is preferred only during initial configuration of the dispensing unit, or at an infrequent re-configuration of the dispensing unit, but not on the day to day restock operation. This is because, particularly in open matrix drawers where nurses have access to more than one medication at a time, it is important that the location of a medication stays constant to reduce possible errors in taking the wrong medication from a location they assumed contained the correct medication.

Figure 9C:
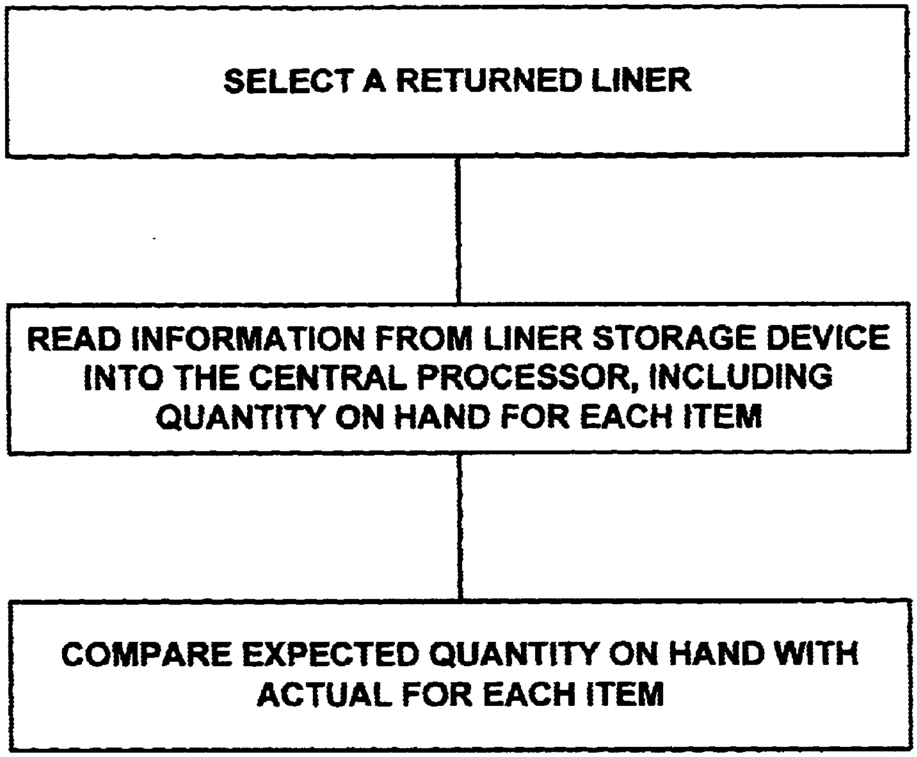
FIG. 9C is a flow-chart illustrating an exemplary method for evaluating the remaining quantities of items held in a liner that has been replaced.

The storage device on the liner provides another advantage when the liner is returned to the pharmacy as illustrated in FIG. 9C. During the period when the liner is in the dispensing unit, the current quantity on hand of each item is tracked by the dispensing unit processor as items are taken by the nurses. These values are updated on the liner storage device. When the liner is returned to the pharmacy, the quantities that should be in each receptacle are read from the liner storage device into the central processor and printed out. The pharmacist then checks the actual quantities to see if any of the medications have been diverted. This is particularly useful and important in the case of controlled substances, and has an advantage over a written record in that the electronic liner storage device is more difficult to tamper with.

Figure 10:
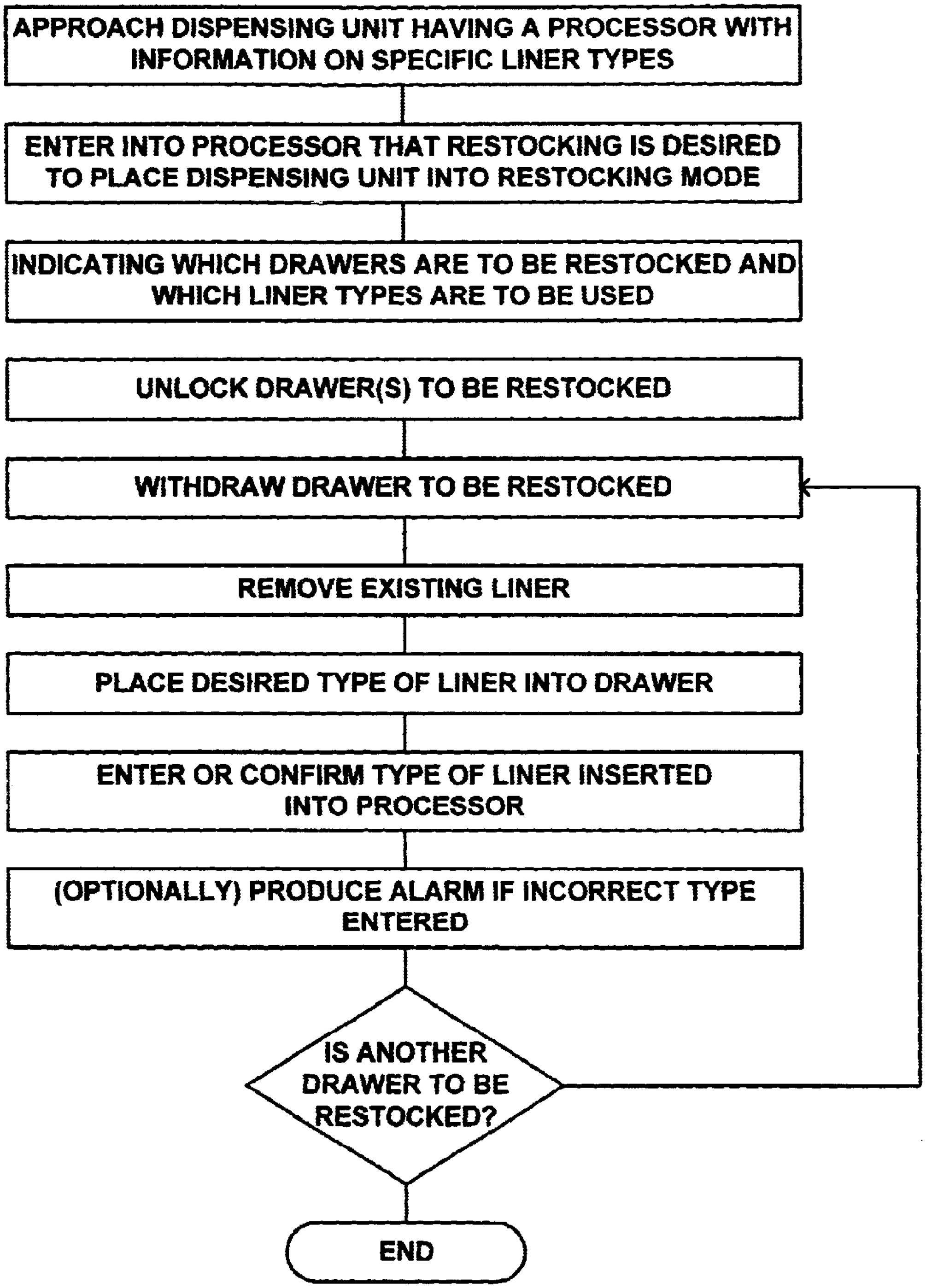
FIG. 10 is a flow chart illustrating an exemplary method for restocking items into a dispensing unit using liners which are grouped into types.

A second method is shown in FIG. 10. In this method, each specific configuration of liner receptacles, the medications that they hold, and the associated par levels is assigned a type. Although there may be many types, the same types of liners may be used in many different dispensing units. Typically, a specific dispensing unit will not have two liners of the same type because such a configuration would provide the same medications in two separate drawers, which is often confusing to the nurses. Instead, the same medication may be held in multiple adjacent receptacles to provide sufficient quantities. However, such an arrangement does not lead to multiple liners of the same type in a single dispensing unit.

At least two liners of each type needed for each dispensing unit are preferably prepared and labeled. In this way, at any given time half of the liners are held in the dispensing units, and the other half are in the pharmacy. The information on configuration, item and par level for each type is entered into the central processor and this information is sent to each dispensing unit's processor. At the dispensing unit, when the initial configuration of the dispensing unit is set up, it is decided which types of liners go into which drawers. This information is entered into the dispensing unit processor so that it knows the locations of the medications and the quantities to expect during a restock.

At the same time, each drawer is preferably clearly labeled, either internally, externally, or both, with the type of liner it should hold. The liners are also labeled so that the technician can clearly see each type of liner.

In the pharmacy, the restock technician typically aligns all the liners of the same type, and restocks the liners at the same time to obtain consistency and reduce errors. The restocked liners are then put aside as the next set of like-type liners are restocked. If items cannot be brought fully up to par, a list of these shortages is attached to each liner.

At the dispensing unit, there is no need to send any restocking information from the central processor. The technician simply enters into the dispensing unit processor their identification and password, and requests that the unit be placed in restocking mode. The technician then selects the drawer where the liner is to be replaced. This may be done by entering the request into the processor and having the processor unlock the drawer. Alternatively, the technician may press a button on the drawer they wish to access. The old liner is then removed and the technician reads the type from the drawer and replaces the liner with a full liner of a similar type that has been brought up from the pharmacy. It is preferable that the technician also enters into the dispensing processor the type of liner placed in the drawer, as a confirming step. In this way, the dispensing unit processor can display and sound an alert if the type is different than the one expected.

In addition to a visual indication of the liner type, the type may also be identified by some form of readable code, such as a magnetic stripe or bar code on the liner itself. In this case, the restocking process employs the use of a hand held reader that is attached to the dispensing unit to read the type into the processor electronically. At this point, the processor lights the light on the correct drawer to be restocked and unlocks the drawer. As noted earlier, it is preferred to not include more than one liner of a specific type in a given dispensing unit. If the liner type was not one that the dispensing unit needed, or if that liner type had already been restocked in that session, the dispensing unit processor preferably displays and sounds an alert.

As an alternative, the technician may press a button the drawer that the technician wishes to restock and the processor will unlock the drawer. The liner identification code of the liner that the technician intends to place in the drawer is then read. If the replaced liner was not of the type the dispensing processor expected for the selected drawer, the processor preferably displays and sounds an alert. These methods of electronically reading the liner types are more secure than simple visual identification.

The technician may also enter into the dispensing unit processor any shortages on any items in the liner that may have been noted when the liner was restocked in the pharmacy. Otherwise, the dispensing unit processor will assume the liner contains the par quantities associated with the liner type that has been assigned to that drawer.

The drawer is then closed and the liner replacement process is repeated for the other drawers that need restocking. Then the technician indicates completion of the restocking process by exiting the dispensing processor, or transferring to a different function.

Because the liner type information completely describes the liner, it is possible to replace a liner by a liner of a different type. When this information is entered into the processor, the processor adjusts it's dispensing operations accordingly. It is preferred to use this method only at initial configuration of the dispensing unit, or at a specific reconfiguration time, since it is important that the location of a medication stays constant in normal day to day operation to reduce possible errors in the process of removing the medications.

Figure 11:
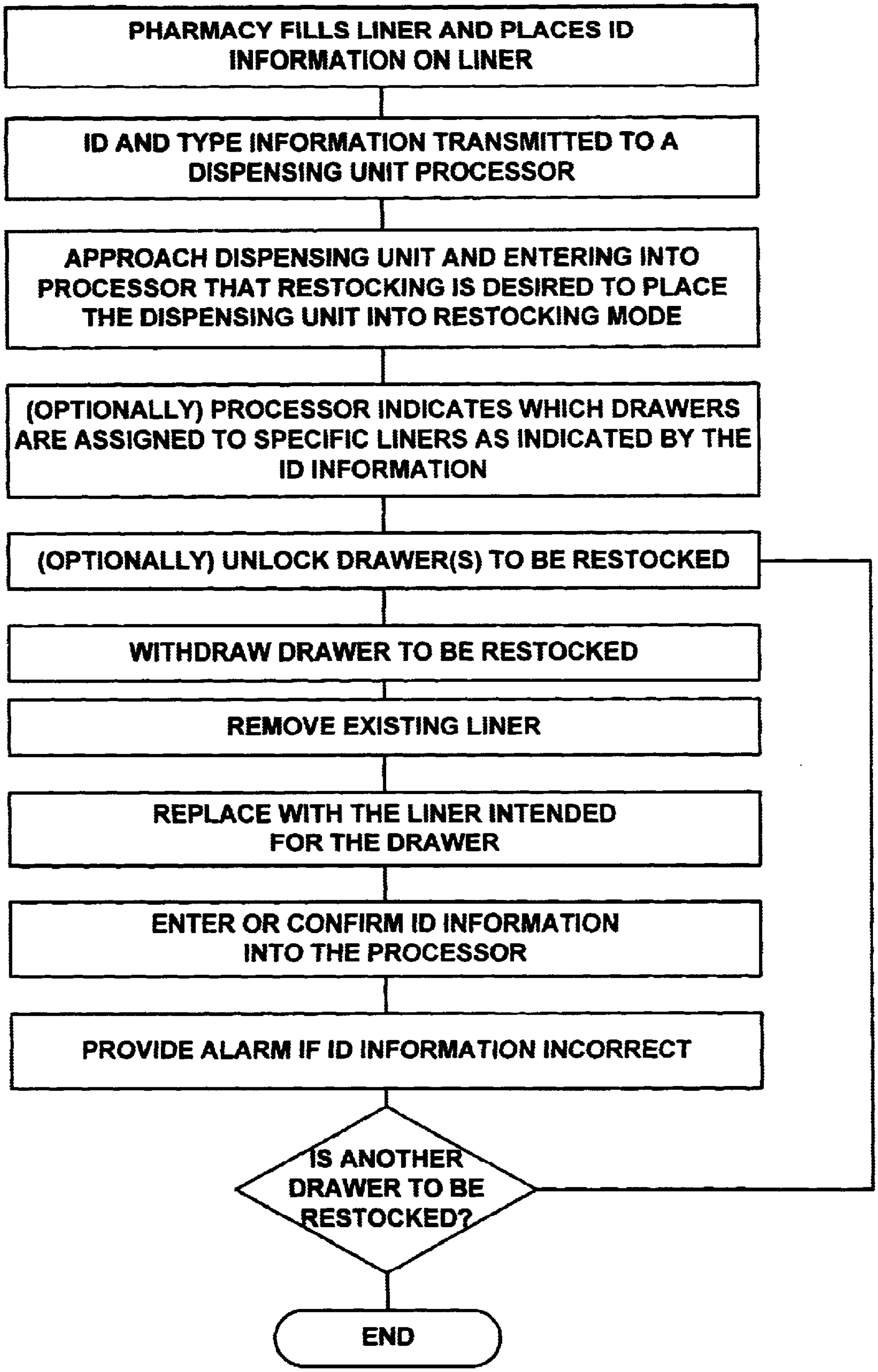
FIG. 11 is a flow chart illustrating an exemplary method for restocking items into a dispensing unit using liners which are assigned a unique identifier.

A third method is illustrated in FIG. 11. In the method of FIG. 11, the process of defining types and assigning them to drawers in the dispensing unit processors is the same as with the method of FIG. 10. Further, the liners are labeled with their configuration type in the same way as in the method of FIG. 10. However, in the method of FIG. 11 each liner is also assigned a unique ID that tracks a specific liner. This unique ID may be placed on a label on the liner and may also be encoded in electronically readable form as a magnetic stripe or bar code label on the liner.

When the liners have been replenished in the pharmacy, an additional step is made to assign specific liners that will go to specific dispensing units. This can be entered manually into the central processor or the unique identification numbers can be read in electronically. The central processor can then alert the technician if a liner of the wrong type is being sent to a dispensing unit, since the central processor preferably includes a table associating the type assigned to each unique liner identification number. Once this information is entered into the central processor, the identification numbers of the liners for each dispensing unit are sent to the units, and a restocking number is assigned to that unit.

The specific liners are then taken up to the dispensing unit. The technician enters his identification number and password into the dispensing unit processor, requests that the unit be placed in restocking mode, and selects the restock number. The dispensing unit processor knows which liners to expect and unlocks the first drawer to be restocked based on the type associated with the liner ID, and the type associated with each drawer, and lights a light to indicate that the drawer is unlocked and displays the unique liner identification number it is expecting. The technician either confirms the number, or preferably uses a reader attached to the dispensing unit to electronically read the number on the liner. At this point the dispensing unit processor displays and sounds an alert if the technician has selected the wrong liner. The technician may also enter at this stage any shortages on any items in the liner that may have been noted when the liner was restocked. Otherwise, the dispensing unit processor will assume the liner contains the par quantities associated with the liner type that has been assigned to that drawer.

The technician then selects the drawer where the liner is to be replaced, removes the old liner and places in the new one. The drawer is then closed and the liner replacement process is repeated for the other drawers that need restocking. The technician indicates completion of the restocking process by exiting the dispensing unit processor, or by transferring to a different function.

While the unique identification of each liner is an additional step to the assignments of types, it provides tracking and accountability for every specific liner. In particular, the identification numbers of the liners brought back to the pharmacy can be read or entered into the central processor by an independent party to confirm that the number of liners returned is equal to the number of liners taken up.

In another aspect of the invention, the liners may be disposed beneath lids having associated sensors to detect when each lid has been lifted. The lids may be configured to be locking or unlocking as described generally in the previously incorporated by reference copending U.S. application Ser. No. 5,905,653 (attorney docket no. 16166-000311), filed on the same date as the present application. The lids are preferably attached to a locking top cover as described generally in U.S. application Ser. No. 5,905,653 (16166-000311) so that access to the liner is accomplished by unlocking the top cover containing the lid array.

Unlocking of the top cover may be done electronically if the entered user identification indicates that the user is a restock technician, preferably at the same time the drawer is unlocked by the processor (whether by pre-entering the liner at the processor, or by manual selection by pushing a button on the drawer to have the drawer opened). During normal dispensing operations, the drawer may be unlocked by a nurse as previously described; however, the top cover will remain locked. Alternatively, unlocking of the top cover can be achieved using a mechanical lock, to which the technician has access once they have entered their user ID, and the drawer is unlocked by the processor.

The invention has now been described in detail for purposes of clarity and understanding. However, it will be appreciated that certain changes and modifications may be made within the scope of the invention. Therefore, the above description should not be taken as limiting the scope of the invention, instead, the scope of the invention should be determined with reference to the appended claims, along with the full scope of equivalents to which those claims are entitled.

What is claimed is:

1. A method for restocking pharmaceutical or medical supply items into a dispensing unit having a processor, wherein at least some of the pharmaceutical or medical supply items are held in removable liners having a plurality of adjustable dividers to divide each liner into receptacles for holding the items, the method comprising:

entering a request into the processor to restock the items into the dispensing unit;

removing one of the liners from the dispensing unit;

replacing the removed liner with a replacement liner having a new inventory of pharmaceutical or medical supply items contained within a configuration of receptacles that is the same as or different than the configuration of receptacles in the removed liner, wherein at least one of the receptacles includes multiple items of the same type;

entering information identifying the replacement liner into the processor;

wherein the liners are grouped into types based on the configuration of the receptacles and the types ana par levels of items held within the receptacles, wherein the processor includes a record of each type of liner, and further comprising entering into the processor the type of liner to which the replacement liner is grouped; entering user identification information into the processor;

entering item removal information into the processor for at least one of the items that is desired to be removed to select the item for removal, wherein the item removal information includes an item type and an associated quantity;

removing the selected item from one of the receptacles that includes multiple items of the same type; and storing a record of the removal along with the number of items remaining within the receptacle.

2. A method as in claim 1, wherein the replacement liner includes an identification device having information on the configuration of the receptacles, the types of items held in the receptacles, and the quantity of items held in the receptacles, and further comprising reading the information from the identification device with a reader upon placement of the liner into the dispensing unit, and transferring the information from the reader to the processor.

3. A method as in claim 2, wherein the identification device comprises an electronic memory device, and wherein the dispensing unit includes a recording device to record information regarding the items removed from the liner, and further comprising comparing the record of removal stored in the memory device with actual inventory levels to determine any discrepancies.

4. A method as in claim 3, further comprising comparing the record of removal with the actual inventory levels at a pharmacy station following removal of the liner.

5. A method as in claim 1, wherein the liners are held within drawers, and further comprising withdrawing one of the drawers prior to removing the liner.

6. A method as in claim 1, wherein the dispensing unit is partitioned into separate locations, wherein the processor includes a record of which types of liners may be placed into each of the locations.

7. A method as in claim 6, wherein the type of liner being replaced is entered into the processor, and further comprising producing an error message and audible alert if the liner type entered is incorrect.

8. A method as in claim 6, further comprising transferring to the processor a list of liner types to be replaced in the unit and the quantities of items held in each of the receptacles that are being delivered from a central pharmacy for restocking.

9. A method as in claim 8, wherein the new quantities of each item are sent electronically from a central pharmacy processor to the processor of the dispensing unit.

10. A method as in claim 9, wherein a restock technician may modify and enter the item quantities to be restocked manually at the dispensing unit processor when the quantities brought are less than expected by the dispensing unit processor.

11. A method as in claim 1, wherein the dispensing unit is partitioned into separate locations, wherein the processor includes a record of the particular type of liner held in each location, and further comprising updating the processor's record to reflect new quantities of each item upon entry of the information into the processor when the replacement liner has been placed into the dispensing unit.

12. A method as in claim 11, wherein the new quantities of each item are sent electronically from a central pharmacy processor to the processor of the dispensing unit.

13. A method as in claim 12, wherein a restock technician may modify or enter the item quantities to be restocked manually at the dispensing unit processor when the quantities brought are less than expected by the dispensing unit processor.

14. A method as in claim 1, wherein the type of liner is stored on the liner, and further comprising reading the type of liner from the replacement liner by a reader in communication with the processor before the replacement liner is placed into the dispensing unit.

15. A method as in claim 14, wherein the dispensing unit includes a plurality of drawers to hold the liners, and wherein the drawers are locked, and further comprising unlocking only the drawer containing the entered type of liner when the type of liner has been electronically read by the reader.

16. A method as in claim 15, wherein the user is guided to the unlocked drawer by a visual indicator.

17. A method as in claim 1, wherein the dispensing unit includes a plurality of drawers to hold the liners, and wherein each drawer is marked with one of the types so that a user may visually identify the type of liner to place in each drawer.

18. A method as in claim 17, further comprising opening one of the drawers, the processor detecting which drawer is open, replacing the liner in the open drawer, entering into the processor a confirmation of the liner type replaced in the drawer, and producing an alarm with the processor if an incorrect replacement liner is placed into the drawer.

19. A method as in claim 18, wherein the liner type is electronically read upon placement of the replacement liner into the drawer by a single reader attached to the dispersing unit.

20. A method as in claim 17, wherein all the drawers are locked, and further comprising entering into the processor the type of liner to be restocked, and unlocking the drawer containing the entered liner type for replacement.

21. A method as in claim 20, wherein the user is guided to the unlocked drawer by a visual indicator.

22. A method as in claim 1, wherein the liners are each assigned a unique identifier, further comprising entering into the processor the identifier for an expected replacement liner prior to entering the restocking request, and further comprising entering the unique identifier for the replacement liner into the processor upon placement of the replacement liner into the dispensing unit.

23. A method as in claim 22, further comprising producing an alarm if the identifier for the expected liner is different from the identifier entered upon replacement of the replacement liner.

24. A method as in claim 22, wherein the replacement liner is filled at a pharmacy station, wherein the pharmacy station assigns the unique identifier to the replacement liner and produces a record of the configuration of the receptacles, the types of items held in the receptacles, and the quantity of items held in the receptacles, and further comprising transmitting the unique identifier and the associated record to the processor of the dispensing unit.

25. A method as in claim 22, wherein the unique identifier is included on the liner, and further comprising reading the identifier from the liner with a reader that is in communication with the processor prior to placement of the replacement liner into the dispensing unit.

26. A method as in claim 22, wherein the unique identifier is included on the liner, and further comprising entering the identifier manually into the processor.

27. A method as in claim 22, wherein the liners are held within lockable drawers, and further comprising unlocking only one drawer at a time when replacing the liners.

28. A method as in claim 27, wherein the user is guided to the unlocked drawer by a visual indicator.

29. A method as in claim 1, further comprising entering into the processor the quantity of at least one item that is contained in the replacement liner.

30. A method for restocking pharmaceutical or medical supply items into a dispensing unit having a processor, wherein at least some of the pharmaceutical or medical supply items are held in removable liners having a plurality of adjustable dividers to divide each liner into receptacles for holding the items, the method comprising:

entering a request into the processor to restock the items into the dispensing unit;

removing one of the liners from the dispensing unit;

replacing the removed liner with a replacement liner having a new inventory of pharmaceutical or medical supply items contained within a configuration of receptacles that is the same as or different than the configuration of receptacles in the removed liner, wherein at least one of the receptacles includes par levels of multiple items of the same type; and entering information identifying the replacement liner into the processor;

wherein each liner includes a unique identifier, wherein the liners are grouped into types based on the configuration of the receptacles and the types and par levels of items held within the receptacles, wherein the processor includes a table having a list of each identifier, the type corresponding to the identifier, and the drawer corresponding to the type, and wherein the dispensing unit includes an entry device to enter the identifier for each liner that is to be restocked into the processor prior to replacing the liner.

31. A method as in claim 30, further comprising transferring to the processor the entry of the table upon initial configuration of the dispensing unit, and further comprising, during restocking, electronically transferring to the processor a list of liner identifiers and the quantities of items held in each liner that are to be restocked from a central pharmacy station which fills the liners with the items.

32. A method as in claim 30, wherein the unique identifier is included on a bar code label, and further comprising reading the bar code label with a bar code reader that is in communication with the processor.

33. A method as in claim 30, further comprising configuring the processor to indicate which drawer is to receive the replacement liner upon entry of the identifier into the processor.

34. A method as in claim 30, further comprising configuring the processor to unlock the drawer that is to receive the replacement liner upon entry of the identifier into the processor.

35. A method as in claim 1, further comprising entering into the processor the quantity of at least one item that is contained in the replacement liner.

36. A method for stocking items into a dispensing unit, the method comprising:

providing a dispensing unit having a processor, at least one drawer, and a liner which is insertable into the drawer, wherein the liner has adjustable dividers which define at least one bin;

adjusting the dividers to accommodate a certain type of item in the bin;

placing a par level of the item into the bin;

attaching an identification device to the liner which includes information about the type of item that is held in the bin and the par level;

placing the liner into the drawer, wherein the dispensing unit includes a reader which reads the information from the identification device and transfers the information to the processor.

37. A method as in claim 36, further comprising removing the liner, replacing the liner with a second liner having adjustable dividers that have been adjusted to accommodate at least one different type of item, and reading the information from an identification device of the second liner.

38. A method as in claim 37, further comprising comparing with the processor the information read from the identification device of the second liner with the information read from the identification device of the liner being replaced.

39. A method as in claim 37, further comprising transferring the information about the type and quantity of the item in the bin of the second liner to the processor.

40. A method as in claim 37, further comprising indicating with the processor that a new type of item is stored in the bin of the second liner.

* * * * *